United States Patent
Keefe et al.

(10) Patent No.: US 12,284,951 B1
(45) Date of Patent: Apr. 29, 2025

(54) AUTOMATIC TIMED WATERING PLANTER

(71) Applicant: J&P Products, LLC, O'Fallon, MO (US)

(72) Inventors: James A. Keefe, O'Fallon, MO (US); Philip J. Sweeney, Maryland Heights, MO (US)

(73) Assignee: J&P Products, LLC, O'Fallon, MO (US)

( * ) Notice: Subject to any disclaimer, the term of this patent is extended or adjusted under 35 U.S.C. 154(b) by 19 days.

(21) Appl. No.: 18/230,292

(22) Filed: Aug. 4, 2023

Related U.S. Application Data

(60) Provisional application No. 63/395,403, filed on Aug. 5, 2022.

(51) Int. Cl.
  *A01G 27/02* (2006.01)
  *A01G 27/00* (2006.01)

(52) U.S. Cl.
  CPC .......... *A01G 27/02* (2013.01); *A01G 27/003* (2013.01); *A01G 27/008* (2013.01)

(58) Field of Classification Search
  CPC .... A01G 27/00; A01G 27/001; A01G 27/003; A01G 27/005; A01G 27/008; A01G 27/02; A01G 27/06
  See application file for complete search history.

(56) References Cited

U.S. PATENT DOCUMENTS

| | | | |
|---|---|---|---|
| 4,937,972 A | 7/1990 | Freitus | |
| 5,638,638 A * | 6/1997 | Moskowitz | A01G 9/04 47/73 |
| 6,345,470 B1 | 2/2002 | Slaght et al. | |
| 7,607,257 B2 | 10/2009 | Goldberg et al. | |
| 8,408,229 B2 | 4/2013 | Goldberg et al. | |
| 11,382,287 B2 | 7/2022 | Allen | |
| 2007/0144069 A1 * | 6/2007 | Gottlieb | A01G 9/023 47/82 |
| 2009/0056219 A1 | 3/2009 | Csoke | |
| 2010/0064581 A1 | 3/2010 | Johnson | |
| 2013/0205662 A1 | 8/2013 | Yancey et al. | |
| 2014/0298719 A1 | 10/2014 | Mackin | |
| 2016/0183485 A1 | 6/2016 | Petry et al. | |
| 2016/0345517 A1 * | 12/2016 | Cohen | A01G 31/02 |

(Continued)

FOREIGN PATENT DOCUMENTS

| | | | |
|---|---|---|---|
| DE | 29718416 U1 | | 3/1998 |
| DE | 202019104581 U1 | * | 10/2019 |
| KR | 20130033637 A | * | 4/2013 |

*Primary Examiner* — Brady W Frazier
*Assistant Examiner* — Spencer T Callaway
(74) *Attorney, Agent, or Firm* — Grace J. Fishel

(57) ABSTRACT

An automatic timed watering planter comprising an inner container with a flange at a top edge and an outer container with a ledge recessed below a top edge upon which the inner container is supported above a water holding space. A battery operated pump with a programmable control unit for an automatic timer is connected to tubing branches which are connected to symmetrically spaced water ports in the flange. Symmetrically spaced posts on the ledge are received in apertures in the flange outboard of the water ports and secured with a clip having a front side with a nozzle outlet connected to one of the tubing branches and rear side with a lip adapted to snap-fit on a bead along a top edge of the outer container.

10 Claims, 9 Drawing Sheets

(56) References Cited

U.S. PATENT DOCUMENTS

| | | |
|---|---|---|
| 2019/0075740 A1 | 3/2019 | Cox |
| 2019/0200549 A1* | 7/2019 | Losada Pla .......... A01G 27/003 |
| 2019/0387696 A1 | 12/2019 | Mikulecky |
| 2022/0095558 A1 | 3/2022 | Allen |
| 2022/0377992 A1 | 12/2022 | Zarate |

* cited by examiner

AUTOMATIC TIMED WATERING PLANTER

BACKGROUND OF THE INVENTION

Field of the Invention

The present invention relates to an automatic timed watering device for spraying a plant growing in a flower pot at an appropriate time with a measured amount of water while raising the humidity level.

Brief Description of the Prior Art

The usual practice in plant watering is to allow the soil to dry out between waterings. While the amount of water being applied may be measured, the watering and drying cycles tend to shock the plant. There are water dispensing devices that provide a water container in fluid capillary contact with the soil through an absorbent pad or the like. But different soils transport water at different rates and the water pressure changes as the water level drops. This makes it difficult for the plant grower to know how much water is actually being applied.

Many houseplants come from the tropics, where humidity is very high; however, the air in most homes is generally dry. Plants have small pores on the underside of their leaves called stomata. Those pores control carbon dioxide uptake and release water as vapor which are central determinants of photosynthesis. Hand misting houseplants is an effective way to boost humidity and keep the stomata open but the effect does not last all day long.

In view of the above what is needed is a watering system under the control of the plant caretaker that allows the caretaker to apply a metered amount of water such that the plant is not under watered or over watered and that further creates an appropriate humidity environment. More particularly what is needed is a motorized watering system that does not utilize a "wicking" method but provides overhead watering, that functions as a whole without separate containers used to pump water to plants and that is fully automated with a USB corded pump.

BRIEF SUMMARY OF VARIOUS PREFERRED EMBODIMENTS OF THE INVENTION

This section provides a general summary of the disclosure, and is not a comprehensive disclosure of its full scope or all of its features.

In accordance with the various embodiments of the present invention, an automatic timed watering planter has an inner container with a flange at a top edge and an outer container with a ledge recessed below a top edge having a bead. The inner container is supported in the outer container by the flange hanging on the ledge with a water holding space below. In one embodiment, the outer container has a filler opening at the top edge for use in filing the water holding space with water.

A battery operated pump with a programmable control unit for an automatic timer is positioned in the water holding space. A manifold splits flow from the pump into tubing branches that are connected to symmetrically spaced water ports in the flange. The ledge has symmetrically spaced posts which are received in apertures in the flange outboard of the water ports when the inner container is seated on the ledge.

In another aspect the planter includes a plurality of clips for securing the inner and outer containers together. Each of the clips has a front side with a nozzle outlet and a rear side with a lip adapted to snap-fit on the bead of the outer container. In a further aspect the clips have attached caps adapted to secure the clip to the posts and a nozzle inlet adapted to connect the nozzle outlet with one of the tubing branches.

In some applications, the nozzle outlet is oval in shape and in other cases the tubing branches are sandwiched between support ribs inside the outer container. In other cases a water viewing window is provided in a sidewall of the outer container below the filler opening.

In a preferred application, the battery operated pump is USB rechargeable and mounted on a tray, said tray received in an aperture in a sidewall and bottom wall of the outer container. In some cases, there are controls for the programmable control unit visible on the outside of the sidewall and a USB port. In other cases, the programming details of the battery operated pump are displayed in a LCD window on the outside of the sidewall.

BRIEF DESCRIPTION OF THE SEVERAL VIEWS OF THE DRAWINGS

In the accompanying drawings in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
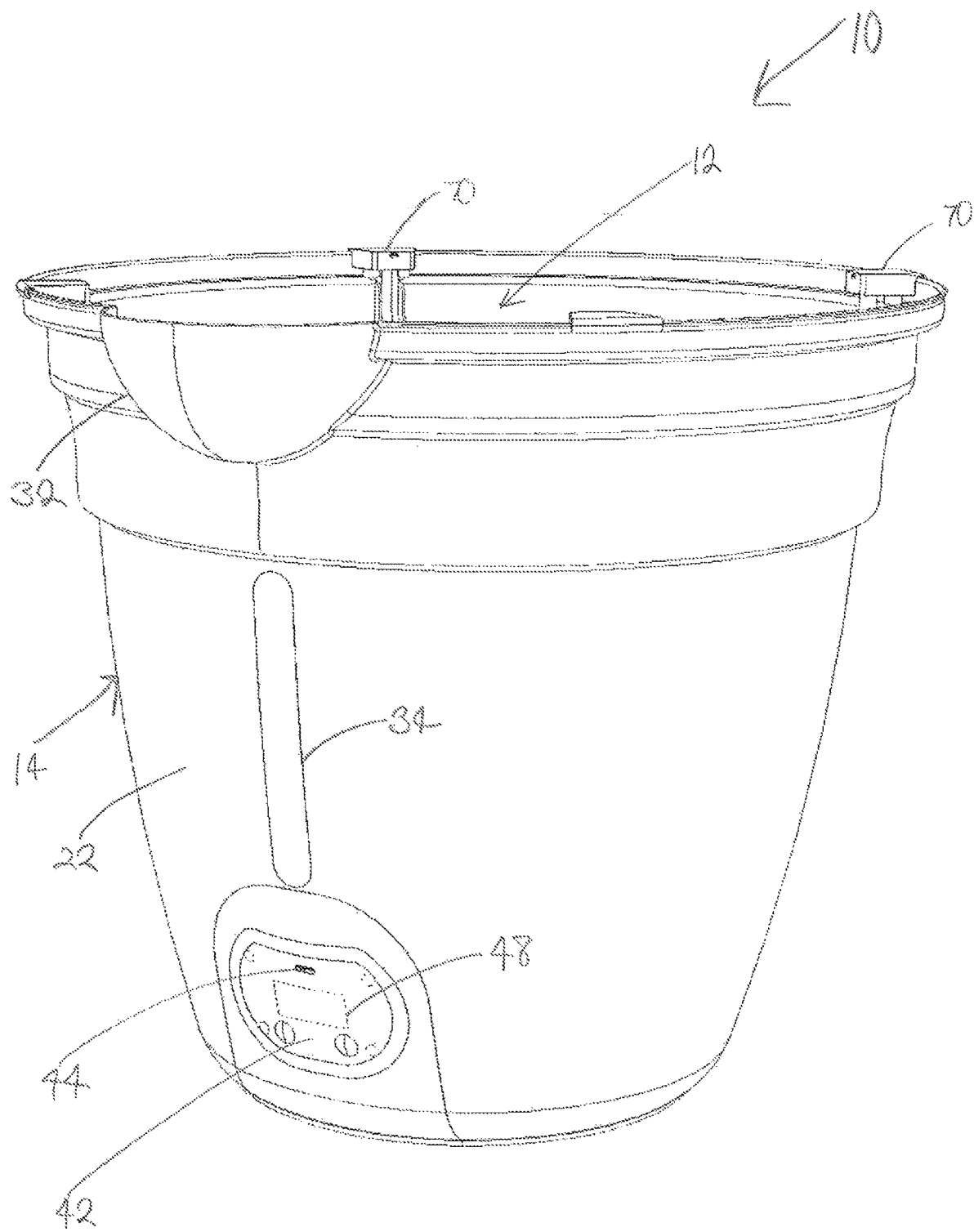
FIG. 1 is perspective side view of an automatic timed watering planter in accordance with the present invention including an inner container with a flange nested on a ledge of an outer container.
Figure 2:
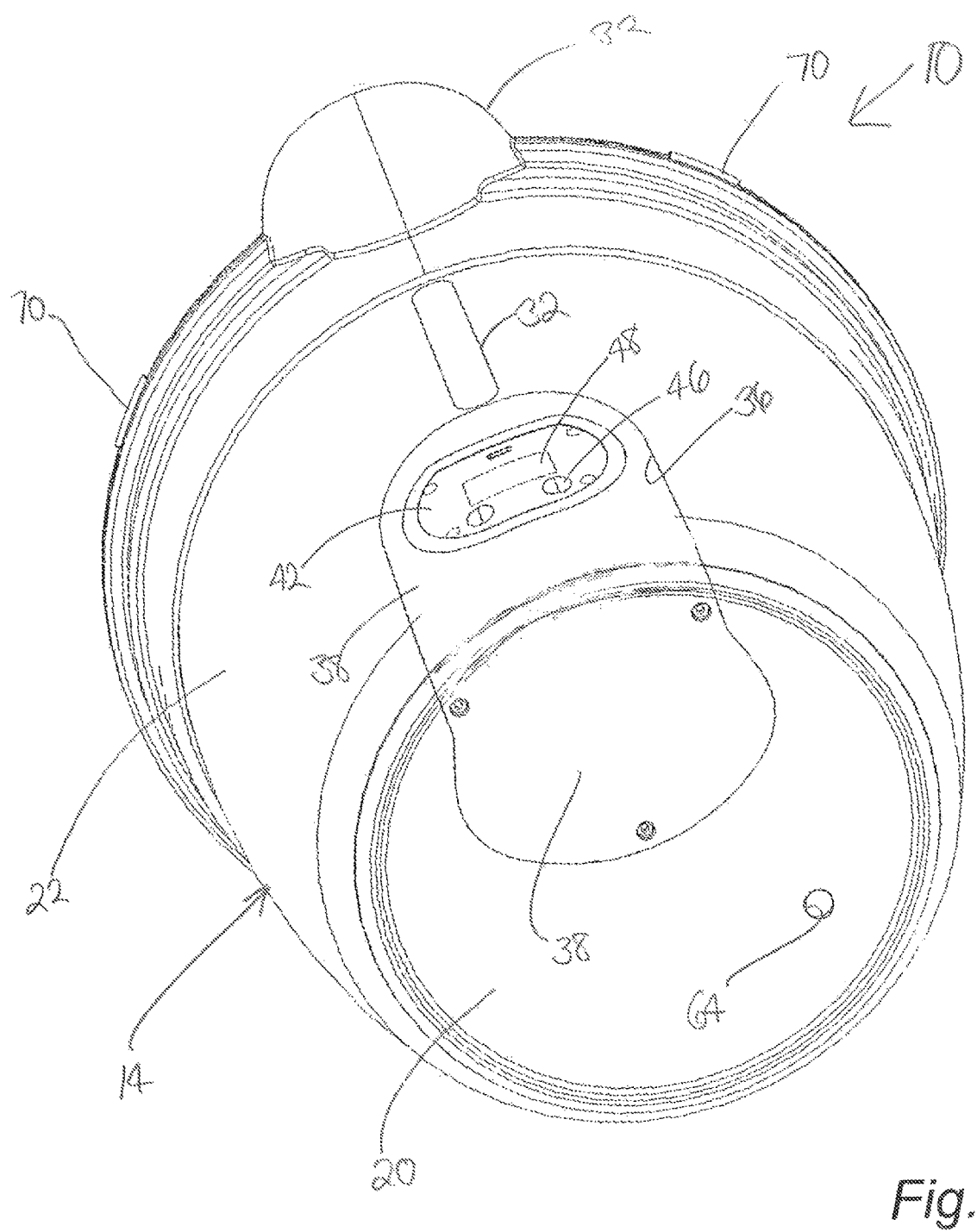
FIG. 2 is bottom perspective view of the planter.

Referring to the drawings more particularly by reference character, an automatic timed watering planter 10 in accordance with the present invention includes an inner container 12 for having a plant potted therein and an outer container 14 for containing an aqueous solution. Inner container 12 has a bottom wall 16 and an upwardly extending sidewall 18 that gradually tapers outwardly. Outer container 14 has a bottom wall 20 and an upwardly extending sidewall 22 that tapers outwardly to a pronounced ledge 24. Ledge 24 acts as a shelf recessed below a top edge and encircling the mouth of the container. Inner container 12 has an outer flange 26 at its top edge and outer container 14 has a bead 28 around its top edge. Inner and outer containers are configured such that inner container 12 is supported in outer container 14 by flange 26 hanging on ledge 24. Sidewall 18 of inner container 12 is shorter than that of outer container 14 such that a water holding space 30 is provided below bottom wall 16 of inner container 12. A filler opening 32 is provided in outer container 14 along the top edge of sidewall 22. A water level viewing window 34 is positioned below filler opening 32 such that a user may monitor the amount of water in the planter which may be augmented with fertilizer.

Figure 3:
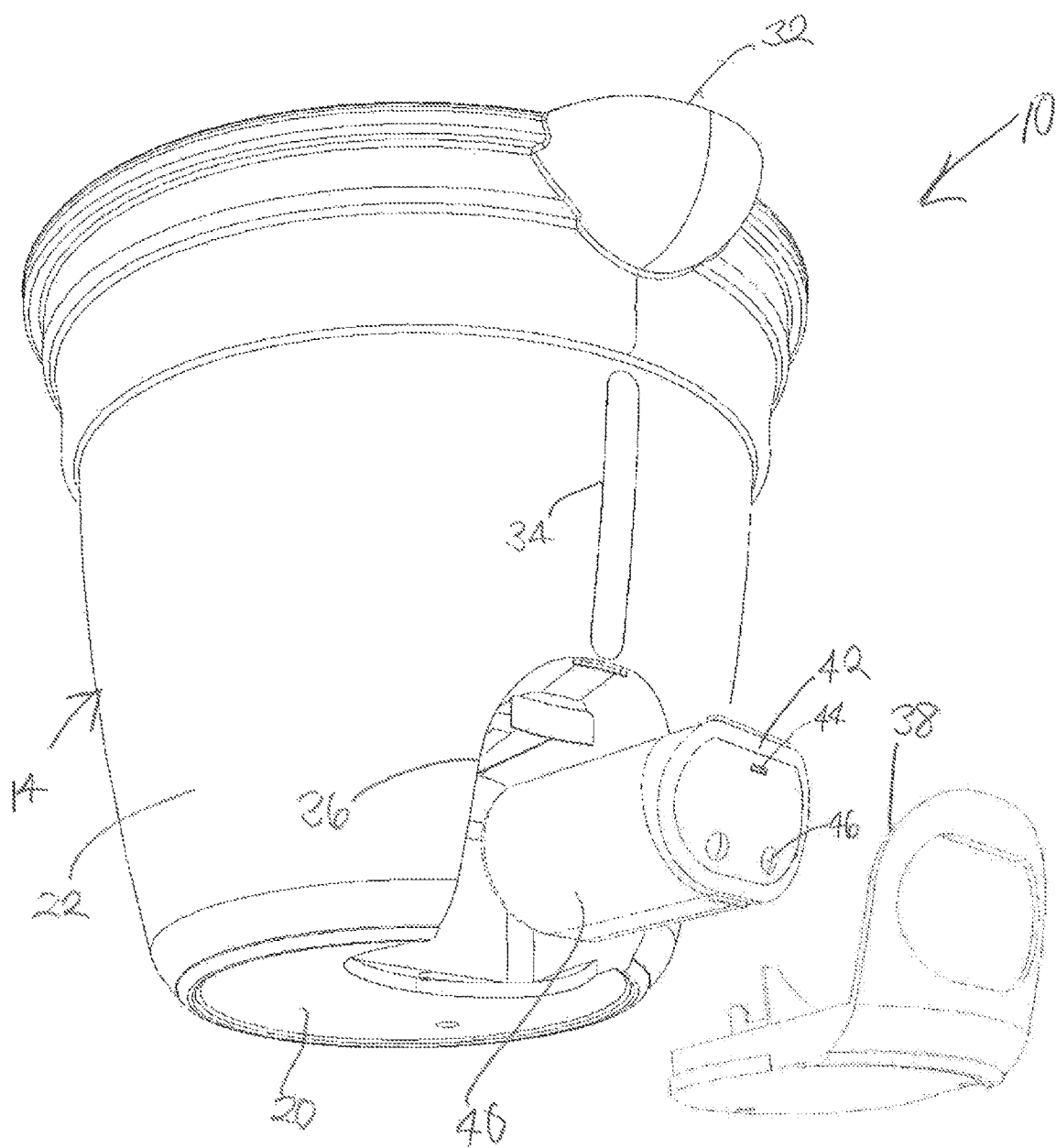
FIG. 3 is a bottom perspective view of the planter with a tray and battery operated pump exploded out of the planter.
Figure 4:
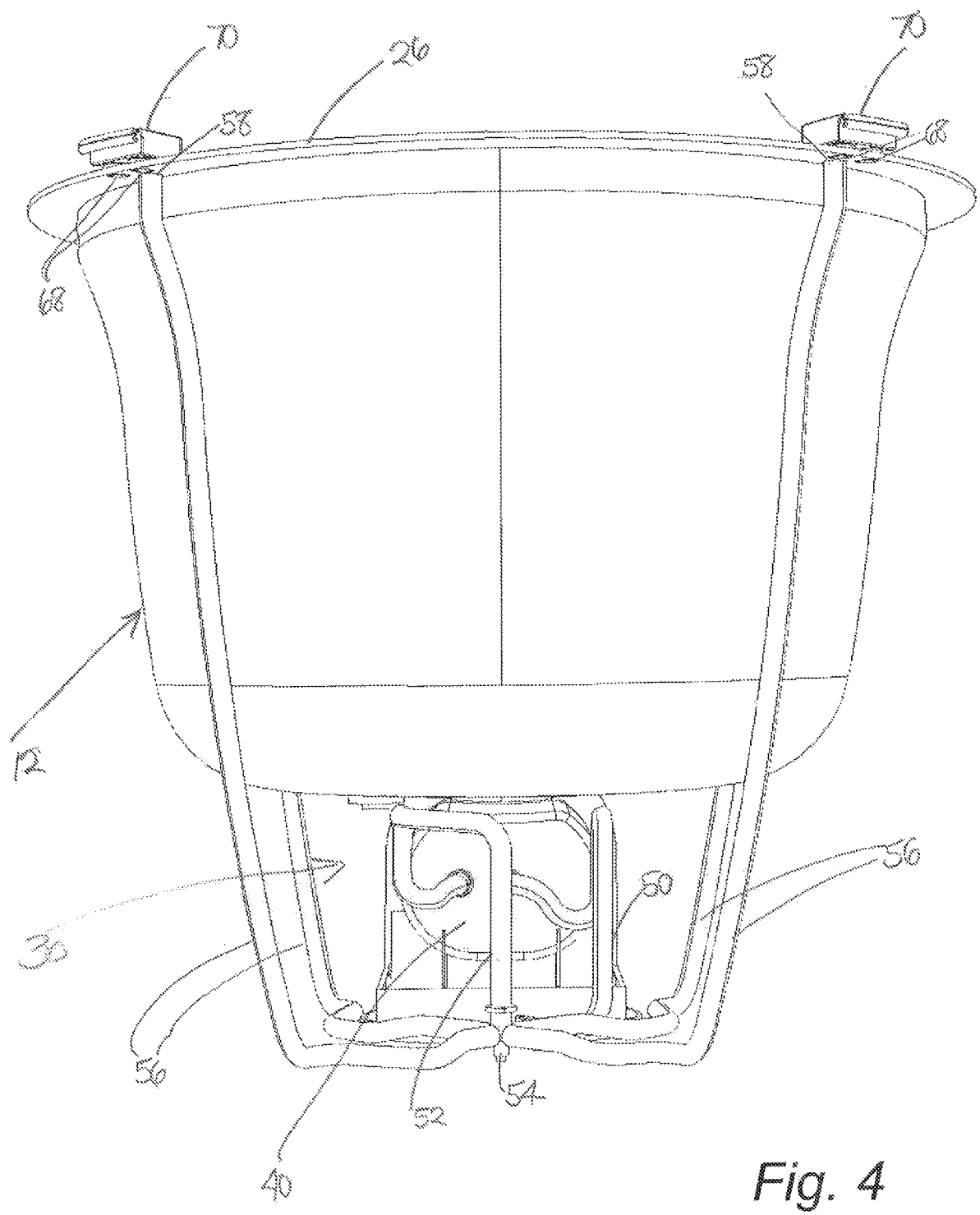
FIG. 4 is a side elevation of the inner container together with the battery operated pump, inlet and outlet hoses and branch tubing.
Figure 5:
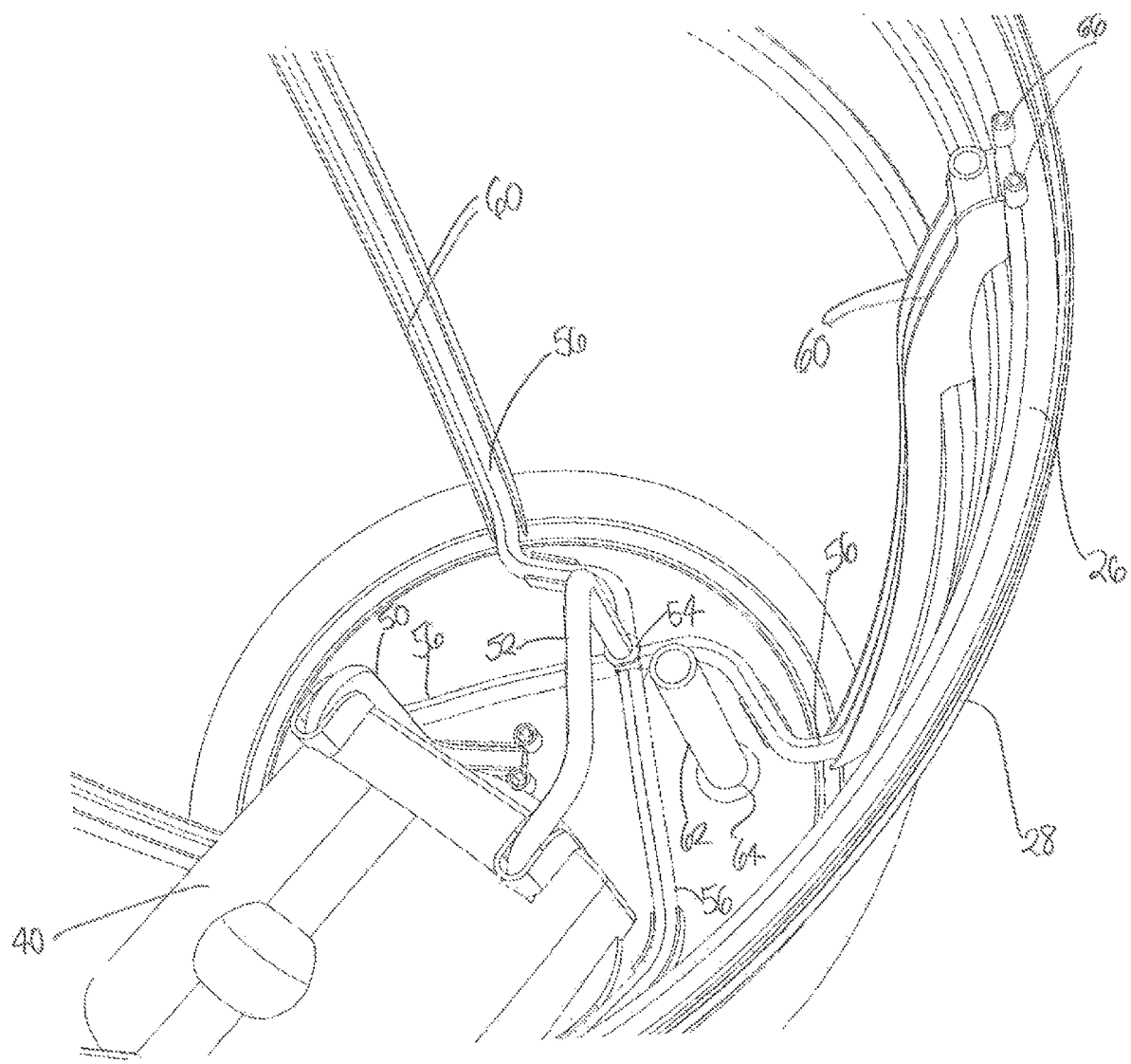
FIG. 5 is a detail looking down into outer container with the inner container removed.
Figure 6:
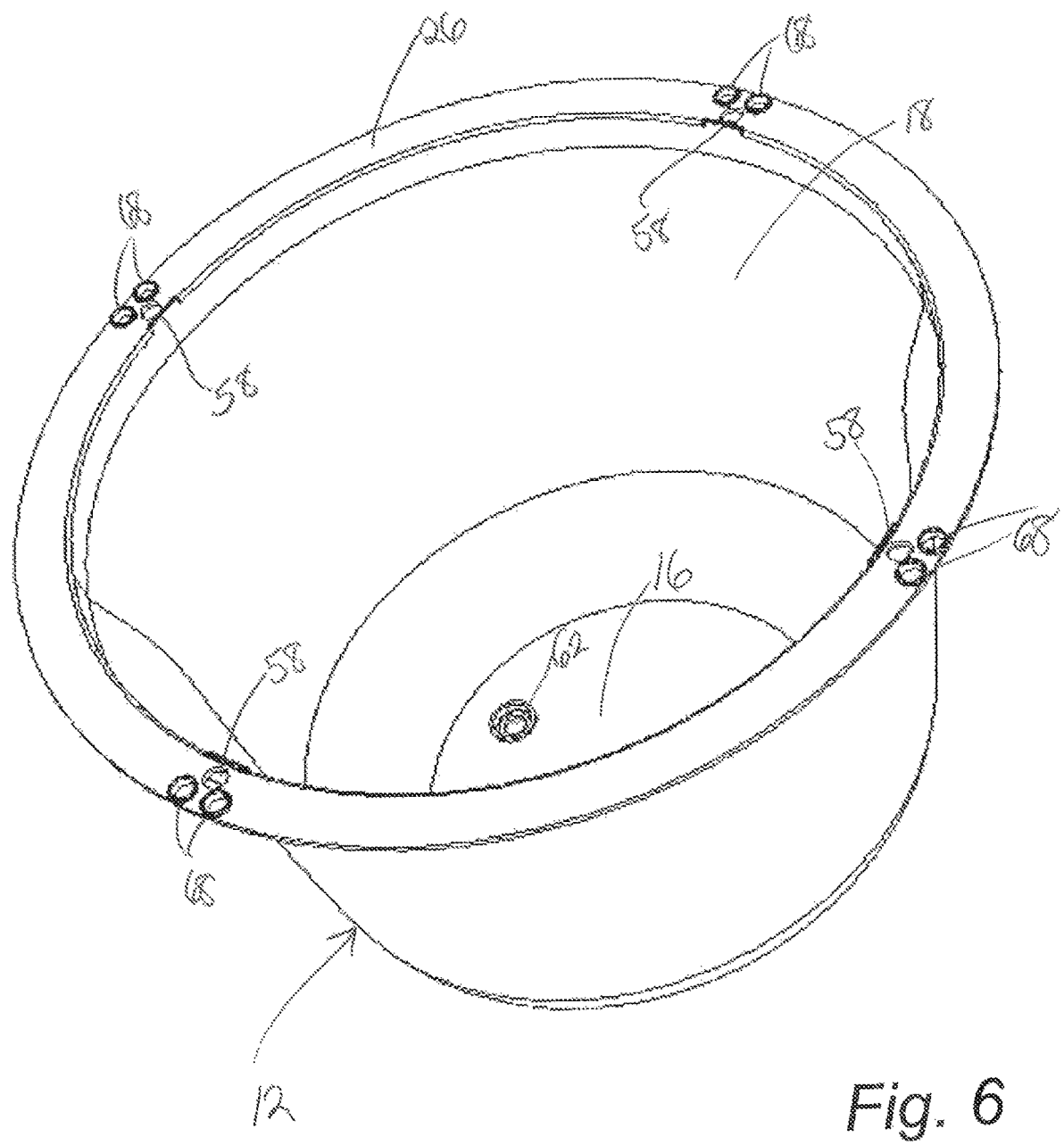
FIG. 6 is perspective view of the inner container.

An aperture 36 is provided in sidewall 22 and bottom wall 20 of outer container 14 into which is fitted a rack tray 38 as shown in FIG. 3. Mounted on tray 38 is a battery operated pump 40 with a programmable control unit 42 for an automated timer. An USB port 44 is provided for recharging the battery operated pump 40. Controls 46 are provided for programming control unit 42 with an automatic timer to pump for a pre-determined interval on a predetermined schedule selected by a user appropriate for watering the plant. Programming details are displayed in a LCD window 48.

Battery operated pump 40 is connected with an intake hose 50 which may be secured to bottom wall 20 of outer container 14 with a weight, clip or the like. An output hose 52 is connected to a pipe manifold 54 that splits the flow into four tubing branches 56 which are routed upward to water ports 58 provided in flange 26. Spaced apart support ribs 60 are provided on sidewall 22 for each branch of the tubing 56 between which the tubing is sandwiched.

A drain hole 62 is provided in bottom wall 16 of inner container 12. A drain tube 62 connected to drain hole 62 and to a drain outlet 64 sealed in bottom wall 20 of outer container 14. If the plant becomes over watered, the aqueous solution can drain into a drain basin or coaster (not shown) into which planter 10 may be seated.

Figure 8A:
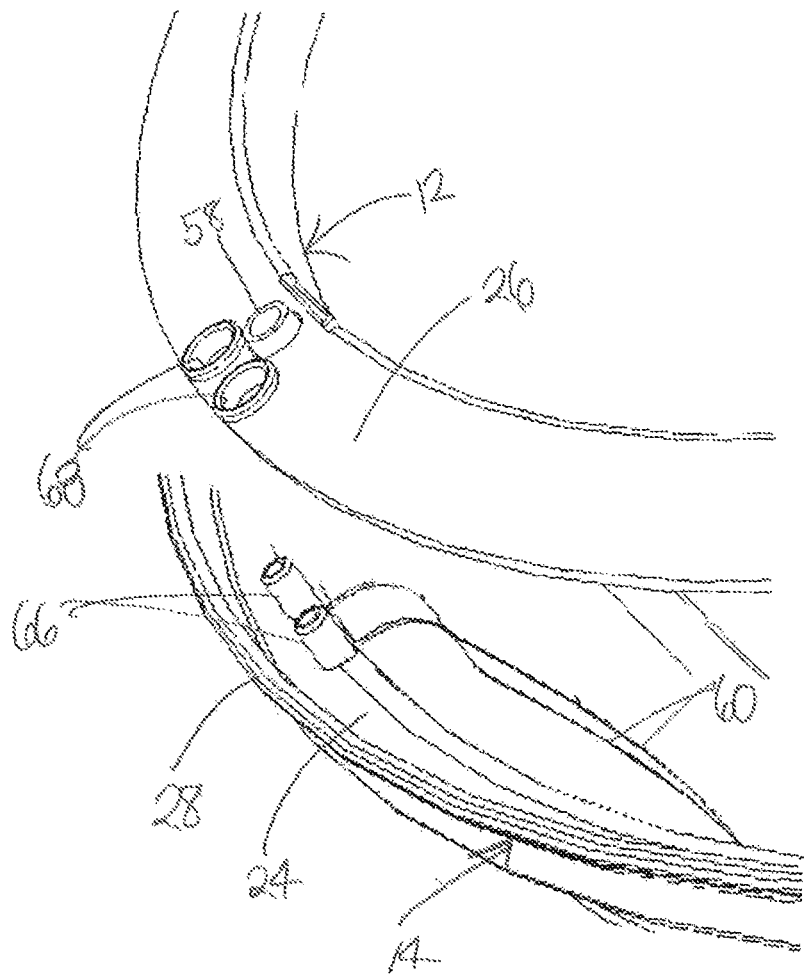
FIG. 8A is a detail showing a water port and outboard apertures in the flange of the inner container and posts on the ledge of the outer container.
Figure 8B:
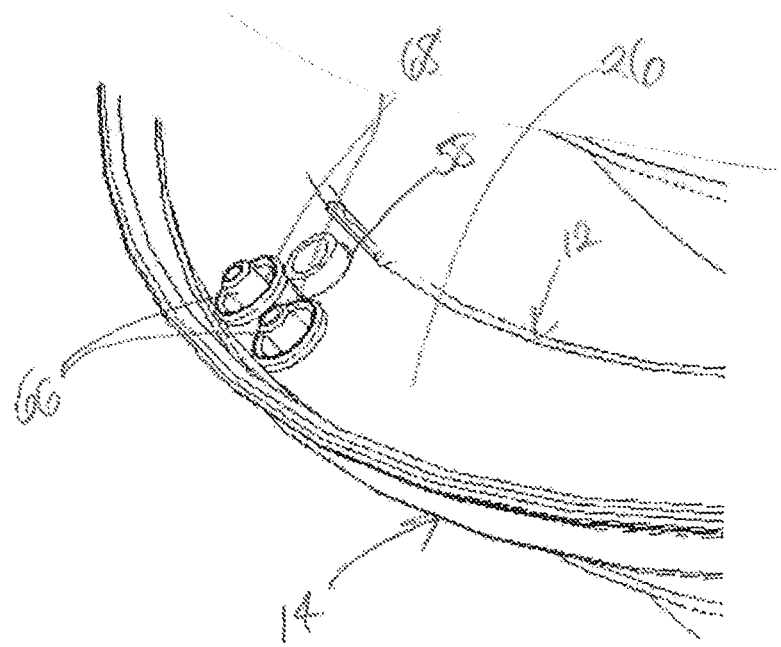
FIG. 8B is a detail showing the flange seated on the ledge.
Figure 8C:
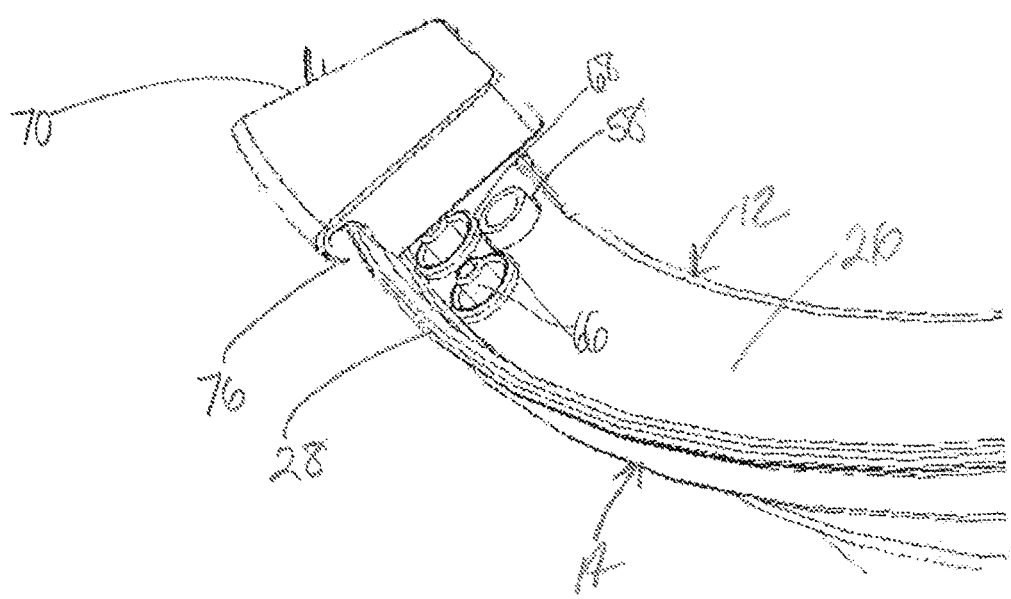
FIG. 8C is a detail showing a clip securing the flange on the ledge.

Vertical posts 66 are provided equiangularly about the circumference of ledge 24. With a cross junction manifold 54 as shown in the drawings, four such groupings of two posts 66 are provided. Turning to FIG. 8B, posts 66 are received through apertures 66 in flange 26. Apertures 68 are positioned outboard of water ports 58 and are aligned with posts 66 when inner container 12 is seated on ledge 24 and secured with a clip 70.

Figure 7A:
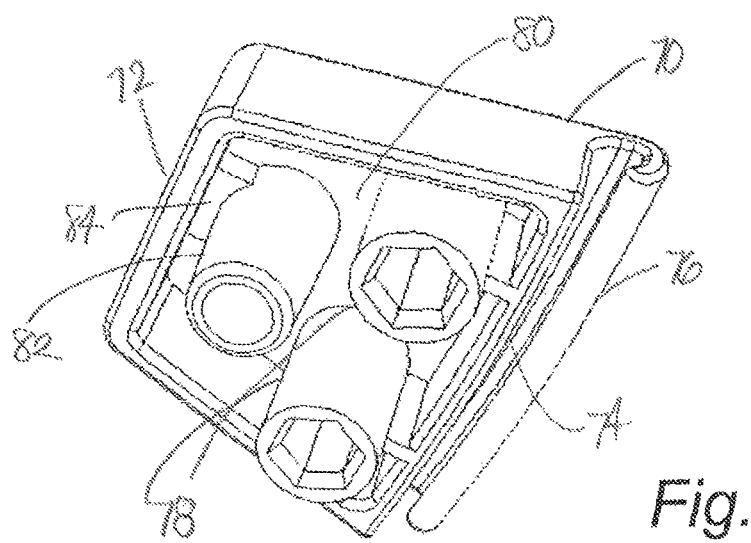
FIG. 7A is a bottom perspective view of a clip.
Figure 7B:
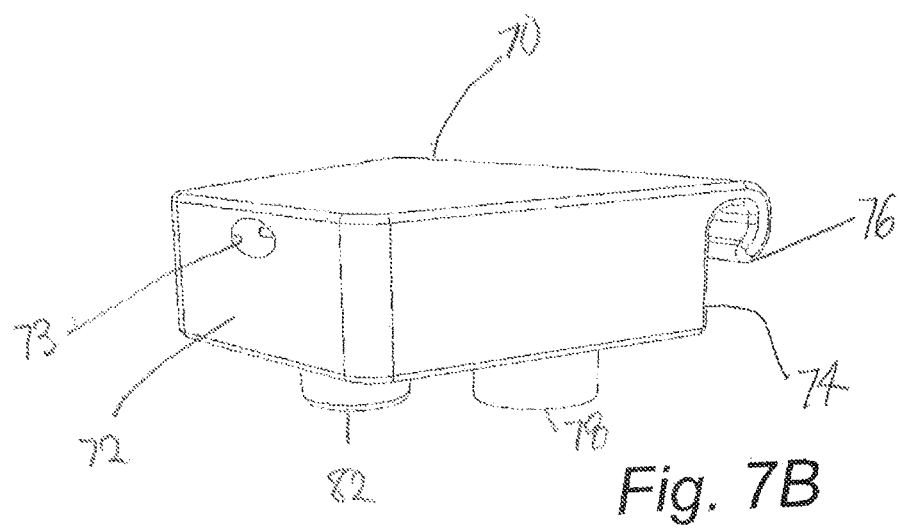
FIG. 7B is a side perspective view of the clip.

As seen in FIGS. 7A and 7B, clip 70 is trapezoidal with a front side 72 with a nozzle outlet 73 and a longer curved rear side 74 that matches the curvature of outer container 14. Rear side 74 has a lip 76 adapted to snap-fit on bead 28. Two cylinders 78 are attached to an underside 80 of clip 70 for capping the posts 66 and securing outer flange 26 on ledge 24. A third cylinder 82 with an elbow 84 is also attached to underside 80. An open end of cylinders 82 passes through water ports 58 and is attached to branch tubing 56 while elbow 84 is connected to nozzle outlet 72. As illustrated, nozzle outlet 72 is oval such that water pumped out of the nozzle is flattened and spread horizontally.

In use, a plant is potted in inner container 12 of planter 10. After charging battery operated pump 40 through USB port 44, programmable control unit 42 may be programmed through controls 46 with the programming results seen in LCD window 48. For this purpose, an instruction manual may be provided with planter 10 showing the amount of water delivered by battery operated pump 40 per unit time such that a user may program the pump for the length of time and interval between times appropriate for the plant. After water holding space 30 is filled with water through filler opening 32, planter 10 may be placed in a coaster and located wherever the user desires. No separate water container is needed.

On the programmed schedule, nozzle outlets 73 symmetrically arranged about top of planter 10 spray water inwardly at a low angle such that the water falls on the top soil of the plant potted in inner container 12 mimicking rain. When nozzle outlets 73 are oval as shown in FIG. 7B, water is delivered in a wide, flat spray, some of which goes into the air building up humidity similar to manually misting the plant. If a user wants to add a fragrant essential oil to the water, a pleasant aromatic scent may be released each time water is sprayed also. The amount of water sprayed and the intervals between spraying are automatic and the amount of water left in the planter may be monitored through water level viewing window 34. Because the planter does not utilize a "wicking" method or sub irrigation method root rot typical in wicking systems is avoided while the plant is adequately watered even if the user is away for an extended period of time.

As various changes could be made in the above constructions without departing from the scope of the invention, it is intended that all matter contained in the above description or shown in the accompanying drawings shall be interpreted as illustrative and not in a limiting sense

What is claimed is:

1. An automatic timed watering planter comprising an inner container with an outwardly directed flange at a top edge and an outer container with an inwardly directed ledge recessed below a top edge having an enlarged bead, said inner container supported in the outer container by the flange seated flat on the ledge with a water holding space below, said outer container having a filler opening at the top edge for use in filing the water holding space with water;

a battery operated pump with a programmable control unit for an automatic timer in the water holding space, said battery operated pump connected to an intake hose and an outlet hose, said outlet hose connected to a manifold splitting flow into at least two tubing branches connected to symmetrically spaced water ports in the flange, at least one post on the ledge received in an aperture in the flange outboard of the water ports, a plurality of clips each with a front side having a nozzle outlet and a rear side with a lip adapted to snap-fit on the bead, said clip having an attached cap adapted to secure the clip to one of the posts, each said clip having an attached nozzle inlet adapted to connect the nozzle outlet with one of the tubing branches.

2. The automatic timed watering planter of claim 1 wherein the nozzle outlet is oval in shape.

3. The automatic timed watering planter of claim 1 wherein the battery operated pump with a programmable control unit of an automatic timer is mounted on a tray, said tray received in an aperture in a sidewall and bottom wall of the outer container.

4. The automatic timed watering planter of claim 1 wherein the tubing branches are sandwiched between support ribs inside the outer container.

5. The automatic timed watering planter of claim 1 having a water viewing window in a sidewall of the outer container directly below the filler opening.

6. An automatic timed watering planter comprising an inner container with an outwardly directed flange at a top edge and an outer container with an inwardly directed ledge recessed below a top edge having an enlarged bead, said inner container supported in the outer container by the flange seated flat on the ledge with a water holding space below, said outer container having a filler opening at the top edge for use in filing the water holding space with water;

a battery operated pump with a programmable control unit for an automatic timer in the water holding space, said battery operated pump connected to an intake hose and an outlet hose, said outlet hose connected to a manifold splitting flow into four tubing branches connected to symmetrically spaced water ports in the flange, at least four symmetrically spaced post pairs on the ledge received in apertures in the flange outboard of the water ports, a plurality of clips each with a front side having a nozzle outlet and a rear side with a lip adapted to snap-fit on the bead, each said clip having attached caps adapted to secure the clip to one of the post pairs, said clip having an attached nozzle inlet adapted to connect the nozzle outlet with one of the tubing branches.

7. The automatic timed watering planter of claim 6 wherein the battery operated pump is mounted on a tray, said tray received in an aperture in a sidewall and bottom wall of the outer container with controls for the programmable control unit visible on the outside of the sidewall.

8. The automatic timed watering planter of claim 7 wherein the battery operated pump is rechargeable with a USB port on the outside of the sidewall.

9. The automatic timed watering planter of claim 8 wherein programming details of the battery operated pump are displayed on a LCD window on the outside of the sidewall.

10. The automatic timed watering planer of claim 6 wherein the tubing branches are sandwiched between support ribs inside the outer container.

\* \* \* \* \*